United States Patent
Nishida et al.

(10) Patent No.: US 7,449,048 B2
(45) Date of Patent: Nov. 11, 2008

(54) METHOD OF REUSING EXHAUST GAS IN POLYMER PRODUCTION PLANT

(75) Inventors: Hiroto Nishida, Ichihara (JP); Kenta Tsubohara, Tokyo (JP); Etsurou Okamoto, Ichihara (JP); Yoshiaki Deguchi, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 520 days.

(21) Appl. No.: 10/506,299

(22) PCT Filed: Mar. 19, 2003

(86) PCT No.: PCT/JP03/03303

§ 371 (c)(1),
(2), (4) Date: Apr. 12, 2005

(87) PCT Pub. No.: WO03/082927

PCT Pub. Date: Oct. 9, 2003

(65) Prior Publication Data

US 2006/0180024 A1     Aug. 17, 2006

(30) Foreign Application Priority Data

Mar. 29, 2002 (JP) .............................. 2002-095606

(51) Int. Cl.
    *B01D 53/04* (2006.01)
(52) U.S. Cl. ................... 95/98; 95/141; 95/144; 585/826; 526/77

(58) Field of Classification Search .................. 95/95, 95/96, 97, 98, 117, 141, 143, 144, 148; 585/820, 585/826, 833; 528/482; 526/77
See application file for complete search history.

(56) References Cited

U.S. PATENT DOCUMENTS

| 2,858,902 | A | * | 11/1958 | Cottle ........................ 95/143 |
| 4,102,983 | A | | 7/1978 | Yamase et al. |
| 4,372,758 | A | | 2/1983 | Bobst et al. |
| 4,727,122 | A | * | 2/1988 | Lee et al. ...................... 526/68 |
| 5,533,437 | A | * | 7/1996 | Howard et al. ................. 95/42 |
| 5,681,908 | A | * | 10/1997 | Mehra et al. .................. 526/68 |
| 5,744,103 | A | | 4/1998 | Yamada et al. |
| 6,322,612 | B1 | * | 11/2001 | Sircar et al. .................... 95/97 |
| 6,706,857 | B2 | * | 3/2004 | Golden et al. ............... 528/482 |
| 2003/0070546 | A1 | * | 4/2003 | Zwilling et al. ................ 95/96 |

FOREIGN PATENT DOCUMENTS

| EP | 0 586 244 A1 | 3/1994 |
| JP | 54-8632 B2 | 4/1979 |

(Continued)

*Primary Examiner*—Frank M Lawrence
(74) *Attorney, Agent, or Firm*—Birch, Stewart, Kolasch & Birch, LLP (57) ABSTRACT

The invention provides a method of reusing an inert gas in a polymer production plant by removing impurities such as a polymerization solvent and polymerization monomers from an inert gas discharged from a polymer production plant. The method of reusing an inert gas comprises a step of adsorbing and removing a polymerization solvent and polymerization monomers contained in an inert gas by passing, through an adsorbent layer, an inert gas discharged from a polymer production plant, wherein an inert gas reaching a predetermined purity by removing the polymerization solvent and polymerization monomers in the step of adsorption and removal is reused in the polymer production plant.

9 Claims, 1 Drawing Sheet

FOREIGN PATENT DOCUMENTS

| | | |
|---|---|---|
| JP | 57-76006 A | 5/1982 |
| JP | 61-296026 A | 12/1986 |
| JP | 61-204018 A | 9/1988 |
| JP | 4-326901 A | 11/1992 |
| JP | 6-285324 A | 10/1994 |
| JP | 9-47635 A | 2/1997 |
| JP | 10-033932 A | 2/1998 |
| JP | 2840563 B2 | 10/1998 |
| JP | 11-152301 A | 6/1999 |
| JP | 2000-026319 A | 1/2000 |
| WO | WO-00/29452 A | 5/2000 |

\* cited by examiner

Fig. 1

METHOD OF REUSING EXHAUST GAS IN POLYMER PRODUCTION PLANT

FIELD OF THE INVENTION

The present invention relates to a method of reusing an exhaust gas in a polymer production plant such as a polyolefin production plant, as well as a device for reutilizing an exhaust gas in a polymer production plant.

DESCRIPTION OF THE RELATED ART

Polyolefins such as polyethylene and polypropylene are (co)polymers having one or more kinds of α-olefins (co)polymerized therein, and are produced annually in the scale of several hundreds tons in various parts of the world.

The method of producing such polyolefins includes a slurry polymerization method, a gaseous phase polymerization method and a solution polymerization method.

These slurry and solution polymerization methods are methods wherein olefins are polymerized by feeding a catalyst and the polymerization monomers to a polymerizer in the presence of an inert gas such as a nitrogen gas and a polymerization solvent.

On one hand, the gaseous phase polymerization method is a method wherein olefins are polymerized by feeding a catalyst and the polymerization monomers to a polymerizer with an inert saturated hydrocarbon for facilitating heat removal or if necessary in the presence of an inert gas. In this case, the catalyst should be previously polymerized in the presence of a solvent, and the catalyst suspended in the solvent is fed to the system.

Accordingly, polymer particles thus polymerized have the polymerization solvent and polymerization monomers adsorbed thereon, and therefore the polymerization solvent and polymerization monomers should be removed and cleaned from the polymer particles.

As a method wherein the polymerization solvent and polymerization monomers adsorbed on the polymer particles are removed from the polymer particles, for example a method that involves introducing a group of polymerized polymer particles into a silo and then spraying a clean inert gas into the silo has been used.

The inert gas used in cleaning the polymer particles contains a large amount of the polymerization solvent and polymerization monomers, and thus a method wherein the polymerization solvent and polymerization monomers contained in the inert gas are combusted in a flare stack (exhaust gas combustion unit) and then the combustion gas, inert gas etc. are released into the air has been used.

However, global warming attributable to $CO_2$ gas is recently problematic, and thus such a method that involves combusting the polymerization solvent needs to be reexamined. At present, disposal of an inert gas such as nitrogen gas needs to be reexamined as well from the viewpoint of energy saving.

Conventionally, some methods have been proposed as techniques wherein hydrocarbons are recovered from a hydrocarbon-containing inert gas and then the inert gas is released into the air.

For example, there are the following proposed methods: (1) a liquid absorption method that involves absorbing a hydrocarbon-containing inert gas by an absorption liquid consisting of an organic liquid as described in JP-B 54-8632 and JP-A10-033932, (2) a method of using a gas separation membrane as described in JP-A 6-285324 and Japanese Patent No. 2840563, (3) a method of liquefying a gas by deep cooling as described in JP-A4-326901, and (4) an adsorption method of using activated carbon and synthetic zeolite.

The methods of treating a hydrocarbon-containing waste gas, as proposed by these prior art literatures, are also proposals for treatment of a waste gas containing volatile hydrocarbons which are liquid at ordinary temperatures, such as gasoline etc. generated mainly in a tanker and a tank.

In JP-A 2000-26319, treatment of a plant exhaust gas is also addressed as a problem. In JP-A 2000-26319, however, the recovery of olefins from an exhaust gas is proposed, but reutilization of an inert gas as a major component of the exhaust gas is not taken into consideration.

Under these circumstances, an object of the present invention is to provide a method of reusing an inert gas in a polymer production plant, which comprises removing impurities such as a polymerization solvent and polymerization monomers from an inert gas discharged from a polymer production plant such as a plant for producing (co)polymers having one or more kinds of α-olefins (co)polymerized therein, for example polyethylene and polypropylene.

Another object of the present invention is to provide a method of reusing a polymerization solvent in a polymer production plant, which comprises recovering the polymerization solvent from an inert gas discharged from the polymer production plant.

A further object of the present invention is to provide a method of such recovery and reuse, which is excellent in energy saving.

DISCLOSURE OF THE INVENTION

The present invention was made to solve the problem in the prior art and the object described above, and the method of reusing an exhaust gas in a polymer production plant according to the present invention is a method of reusing an exhaust gas in a polymer production plant in order to reuse an inert gas discharged from a polymer production plant, which comprises a step of adsorbing and removing a polymerization solvent and polymerization monomers contained in an inert gas by passing, through an adsorbent layer, an inert gas discharged from the polymer production plant, wherein an inert gas reaching a predetermined purity by removing the polymerization solvent and polymerization monomers in the step of adsorption and removal is reused in the polymer production plant.

Further, the device for reusing an exhaust gas in a polymer production plant according to the present invention is a device for reusing an exhaust gas in a polymer production plant in order to reuse an inert gas discharged from a polymer production plant, comprising:

an adsorption eliminator constituted to adsorb and remove a polymerization solvent and polymerization monomers contained in an inert gas bypassing an inert gas discharged from the polymer production plant, through an adsorbent layer, a device for refluxing an inert gas reaching a predetermined purity by adsorbing and removing the polymerization solvent and polymerization monomers in the adsorption eliminator, to the polymer production plant in order to reuse the inert gas in the polymer production plant, and an inert gas holder drum for pressurization from a depressurized state in a desorption step to an operational compressed state in an adsorption step.

By this constitution, an inert gas discharged from a plant for producing copolymers having one or more kinds of α-olefins (co)polymerized therein, for example polyethylene and polypropylene, is passed through an adsorbent layer, whereby a polymerization solvent and polymerization monomers contained in the inert gas can be adsorbed and removed. Then, the inert gas reaching a predetermined purity by adsorbing and removing the polymer solvent and polymerization monomers can be reused in drying polymerization powder in a drying step in the polymer production plant.

Accordingly, the present invention is opposed to the prior art wherein a polymerization solvent and polymerization monomers contained in an inert gas are burned and then the burned gas and the inert gas are released to the air; therefore, global warming attributable to $CO_2$ gas can be prevented in the present invention.

Further, the inert gas can be reused in the polymer production plant and effectively utilized as a resource, and thus the present invention is extremely useful in respect of energy saving.

In the present invention, the adsorbent is characterized by being silica gel and/or synthetic zeolite.

By this constitution, the polymerization solvent and a part of the polymerization monomers can be adsorbed by silica gel, and the polymerization monomers can be adsorbed by synthetic zeolite.

In the method of reusing an exhaust gas in a polymer production plant according to the present invention, the adsorbent layer is composed of a single layer of at least one kind of adsorbent selected from silica gel and synthetic zeolite, is formed from plural layers each consisting of a single layer of the same or different kind of adsorbent described above, or is formed from the single or plural layers combined with an adsorbent layer consisting of an adsorbent other than silica gel and synthetic zeolite.

The adsorbent layer is preferably formed from:
(1) a single layer of silica gel or synthetic zeolite,
(2) plural layers having the single layer of silica gel combined with a single layer of zeolite, or
(3) plural layers each consisting of the single layer of silica gel.

By this constitution, impurities in the exhaust gas can be efficiently removed.

The method of reusing an exhaust gas in a polymer production plant according to the present invention is characterized in that water is also removed in the step of adsorption and removal.

The device for reusing an exhaust gas in a polymer production plant according to the present invention is characterized in that the adsorption eliminator is constituted so as to remove water as well.

By this constitution, water in the inert gas can also be removed, and therefore, when the inert gas is reused in drying polymer powder in the drying step in the polymer production plant, corrosion of facilities and reduction of polymerization activity can be prevented, and even if the inert gas is used as purge gas or a hydrophilic adsorbent is present, the performance of the adsorbent will not be deteriorated.

In the present invention, it is preferable that the adsorbent layer comprises at least two adsorbent layers different in pore diameter laminated in the order of large to small pore diameters in the direction of flow of an exhaust gas.

In this case, the pore diameter in the present invention is determined preferably by a material to be adsorbed. For example, silica gel having a large pore diameter may be used in adsorption and removal of C4 to C15 hydrocarbons such as polymerization solvent and comonomer, and water. On the other hand, silica gel having a small particle diameter may be used in adsorption and removal of C3 to C4 hydrocarbons.

In the present invention, synthetic zeolite is used preferably in adsorption and removal of C2 to C3 hydrocarbons.

By this constitution, hydrocarbons such as polymerization solvent having a relatively high molecular weight, and water, are adsorbed and removed by the silica gel layer having a large pore diameter (for example, a pore diameter of 6 nm), and then a majority of hydrocarbons such as polymerization monomers having a relatively low molecular weight are adsorbed and removed by the silica gel layer having a small pore size (for example, a pore diameter of 3 nm), and hydrocarbons such as polymerization monomers which could not be completely adsorbed and removed by these silica gel layers are adsorbed and removed by the synthetic zeolite layer (for example, a pore diameter of 0.9 to 1.0 nm), and the impurities can be removed efficiently by passing an exhaust gas through these layers successively.

In the present invention, the silica gel may be generally known silica gel, but is preferably the one containing hydrophobic silica gel having a low ability to adsorb water.

That is, the silica gel is preferably hydrophobated silica gel because of its high ability to adsorb hydrocarbons and an adsorption column in the adsorption eliminator can be designed to be smaller than with only hydrophilic silica gel having a high ability to adsorb water.

When saturation water in an exhaust gas is to be adsorbed and removed, such hydrophobated silica gel can sufficiently adsorb and remove the water, and thus a particularly large adsorption column is not necessary. If necessary, a hydrophilic silica gel layer may be further arranged in a region upstream from the hydrophobic silica gel.

In the present invention, the synthetic zeolite is preferably the one which adsorbs and removes polymerization monomers which could not completely be adsorbed and removed by the silica gel layer, and for example, the synthetic zeolite is preferably hydrophilic one in order to remove ethylene and residual propylene.

The method of reusing an exhaust gas in a polymer production plant according to the present invention is characterized by including a desorption step wherein the polymerization solvent and polymerization monomers adsorbed onto the adsorbent in the adsorbent layer are desorbed and removed from the adsorbent under reduced pressure.

The device of reusing an exhaust gas in a polymer production plant according to the present invention is characterized by including a desorption device wherein the polymerization solvent and polymerization monomers adsorbed onto the adsorbent in the adsorbent layer are desorbed and removed from the adsorbent under reduced pressure.

By this constitution, the polymerization solvent and polymerization monomers adsorbed onto the adsorbent in the adsorbent layer can be desorbed and removed from the adsorbent. When the adsorption operation is carried out for a certain time, pores are filled with substances adsorbed onto the adsorbent, resulting in failing to treat the exhaust gas to permit the exhaust gas (i.e. breakthrough exhaust gas) to pass through the adsorbent layer, but the constitution described above can cancel this breakthrough, thus permitting the device to restore its action on adsorption and removal.

The method of reusing an exhaust gas in a polymer production plant according to the present invention is characterized in that the desorption step involves depressurizing the adsorbent layer to a lower pressure than in the step of adsorption and removal thereby desorbing and removing, from the adsorbent, the polymerization solvent and polymerization monomers adsorbed onto the adsorbent in the adsorbent layer.

Further, the device for reusing an exhaust gas in a polymer production plant according to the present invention is characterized in that the desorption device includes a depressurizing device constituted to depressurize the adsorbent layer to a lower pressure than the adsorption eliminator thereby desorbing and removing, from the adsorbent, the polymerization solvent and polymerization monomers adsorbed onto the adsorbent in the adsorbent layer.

By this constitution, the polymerization solvent and polymerization monomers adsorbed onto the adsorbent in the adsorbent layer can be desorbed and removed efficiently and completely from the adsorbent by the action of depressurization.

The method of reusing an exhaust gas in a polymer production plant according to the present invention is characterized in that the desorption step involves depressurizing the polymerization solvent and polymerization monomers adsorbed onto the adsorbent in the adsorbent layer while introducing a purge gas into the adsorbent layer, whereby the polymerization solvent and polymerization monomers adsorbed onto the adsorbent in the adsorbent layer are desorbed and removed from the adsorbent.

The device for reusing an exhaust gas in a polymer production plant according to the present invention is characterized in that the desorption device depressurizes the polymerization solvent and polymerization monomers adsorbed onto the adsorbent in the adsorbent layer, and includes a device for introducing a purge gas into the adsorbent layer, whereby the polymerization solvent and polymerization monomers adsorbed onto the adsorbent in the adsorbent layer are desorbed and removed from the adsorbent.

By this constitution, the action to desorb the polymerization solvent and polymerization monomers adsorbed onto the adsorbent in the adsorbent layer can be promoted by the action of the purge gas, to improve the efficiency of desorption.

The method of reusing an exhaust gas in a polymer production plant according to the present invention is characterized in that the purge gas is an inert gas reaching a predetermined purity by removing the polymerization solvent and polymerization monomers in the step of adsorption and removal.

The device for reusing an exhaust gas in a polymer production plant according to the present invention is characterized in that the purge gas introducing device is constituted to use, as the purge gas, an inert gas reaching a predetermined purity by removing the polymerization solvent and polymerization monomers in the adsorption eliminator.

By this constitution, a part of the inert gas reaching a predetermined purity by removing the polymerization solvent and polymerization monomers in the step of adsorption and removal can be used as the purge gas, thus making use of a new inert gas source unnecessary to reduce costs and contribute to resource saving.

As the purge gas in the present invention, it is desired to use a high-purity inert gas having a purity of 98.0% or more and a water content of 100 vol-ppm or less, preferably a purity of 99.0% or more and a water content of 50 vol-ppm or less.

The device for reusing an exhaust gas in a polymer production plant according to the present invention is characterized in that the purge gas introducing device is constituted to use a high-purity inert gas as the purge gas.

Because a high-purity inert gas is used as the purge gas, the action to desorb the polymerization solvent and polymerization monomers adsorbed onto the adsorbent in the adsorbent layer can be promoted by the action of the impurity-free purge gas, to improve the efficiency of desorption.

In the present invention, an exhaust gas at the upstream side and/or an inert gas reaching a predetermined purity at the downstream side is used in pressurizing the adsorbent layer from the state of reduced pressure in the desorption step to the operational pressurized state in the adsorption step.

However, this operation should be carried out in a short time and causes a large fluctuation in flow rate. In the polymer production plant, an exhaust gas is discharged continuously while an inert gas reaching a predetermined purity is continuously reused, and thus the fluctuation in flow rate should be prevented to the maximum degree in order to continue stable operation.

In the present invention, therefore, one kind of inert gas selected from an inert gas having previously reached a predetermined purity and a new inert gas, charged in an inert gas holder drum, is preferably used in pressurization from the state of reduced pressure in the desorption step to the operational pressurized state in the adsorption step.

In this case, an inert gas charged in the inert gas holder drum is charged preferably at a higher pressure than in the operational pressure in the adsorption step in order to reduce the pressurization time.

In the method of reusing an exhaust gas in a polymer production plant according to the present invention, it is preferable that the polymerization solvent which was desorbed and removed in the desorption step from the adsorbent in the adsorbent layer is recovered by known recovery techniques such as cooling, membrane separation etc. and reused in the step of reusing the polymerization solvent in the polymer production plant.

The device for reusing an exhaust gas in a polymer production plant according to the present invention preferably comprises a polymerization solvent recovery device wherein the polymerization solvent desorbed and removed from the adsorbent in the adsorbent layer by the desorption device is recovered and reused in the polymer production plant.

By this constitution, the polymerization solvent desorbed and removed from the adsorbent in the adsorbent layer can be recovered and reused in the polymer production plant, thus improving efficiency, reducing costs and contributing to resource saving.

Further, the device for reusing an exhaust gas in a polymer production plant according to the present invention is characterized by including an exhaust gas combustion device for combustion and disposal of a desorbed gas containing the polymerization solvent recovered in the polymerization solvent recovery device.

By this constitution, the polymerization solvent is recovered from the desorbed gas, and polymerization monomers in the desorbed gas are then combusted and released to the air, and thus $CO_2$ gas is hardly generated and global warming is not caused.

The method of reusing an exhaust gas in a polymer production plant according to the present invention is characterized by including a step of reusing polymerization monomers contained in a desorbed gas from which the polymerization solvent was recovered in the step of reusing the polymerization solvent.

The device for reusing an exhaust gas in a polymer production plant according to the present invention is characterized by including a polymerization monomer refining device for refluxing the polymerization monomers to the polymer production plant in order to refine and reuse the polymerization monomers contained in the desorbed gas from which the polymerization solvent was recovered in the polymerization solvent recovery device.

By this constitution, the polymerization monomers contained in the desorbed gas from which the polymerization solvent was recovered in the polymerization solvent recovery device can be reutilized after recovery, refining and separation in an ethylene plant etc., and the polymerization monomers can be reused as a polymerization material in a polymer production plant, thus improving efficiency, reducing costs and contributing to resource saving.

The device for reusing an exhaust gas in a polymer production plant according to the present invention is characterized by including at least two adsorption eliminators constituted such that the adsorption removal operation is conducted in one of the adsorption eliminators, while the adsorption removal operation is conducted in the other adsorption eliminator(s).

By this constitution, the adsorption removal operation is conducted in one of the adsorption eliminators, while the adsorption removal operation is conducted in the other adsorption eliminator(s); therefore, even if any one of the adsorption eliminators is in a breakthrough state, the adsorption removal operation can be continuously conducted in the other adsorption eliminator(s) without stopping the plant, thus preventing the efficiency of operation from dropping.

BRIEF DESCRIPTION OF THE DRAWINGS

FIG. 1 shows an illustration of the whole of the device for reusing an exhaust gas in a polymer production plant according to the present invention, wherein:
1A: valve
1B: valve
1a: line
1b: line
1: exhaust gas introduction line
1C: first joint
1D: first' joint
2A: valve
2B: valve
2a: line
2b: line
2: treated-gas refluxing line
2C: second joint
2D: second' joint
3A: valve
3B: valve
3a: line
3b: line
3: line
3C: third joint
3D: third' joint
4A: valve
4B: valve
4a: line
4b: line
4: depressurization device
5: solvent liquefaction recovery device
6: polymer production plant
7: discharge line
8: polymerization solvent refluxing line
9: exhaust gas combustion device
10: branched part
11: branched part
12: branched part
13: line
14: solvent refining device
A: adsorption column
B: adsorption column

DETAILED DESCRIPTION OF THE INVENTION

Hereinafter, the present invention is described in more detail by reference to embodiments thereof.

Figure 1:
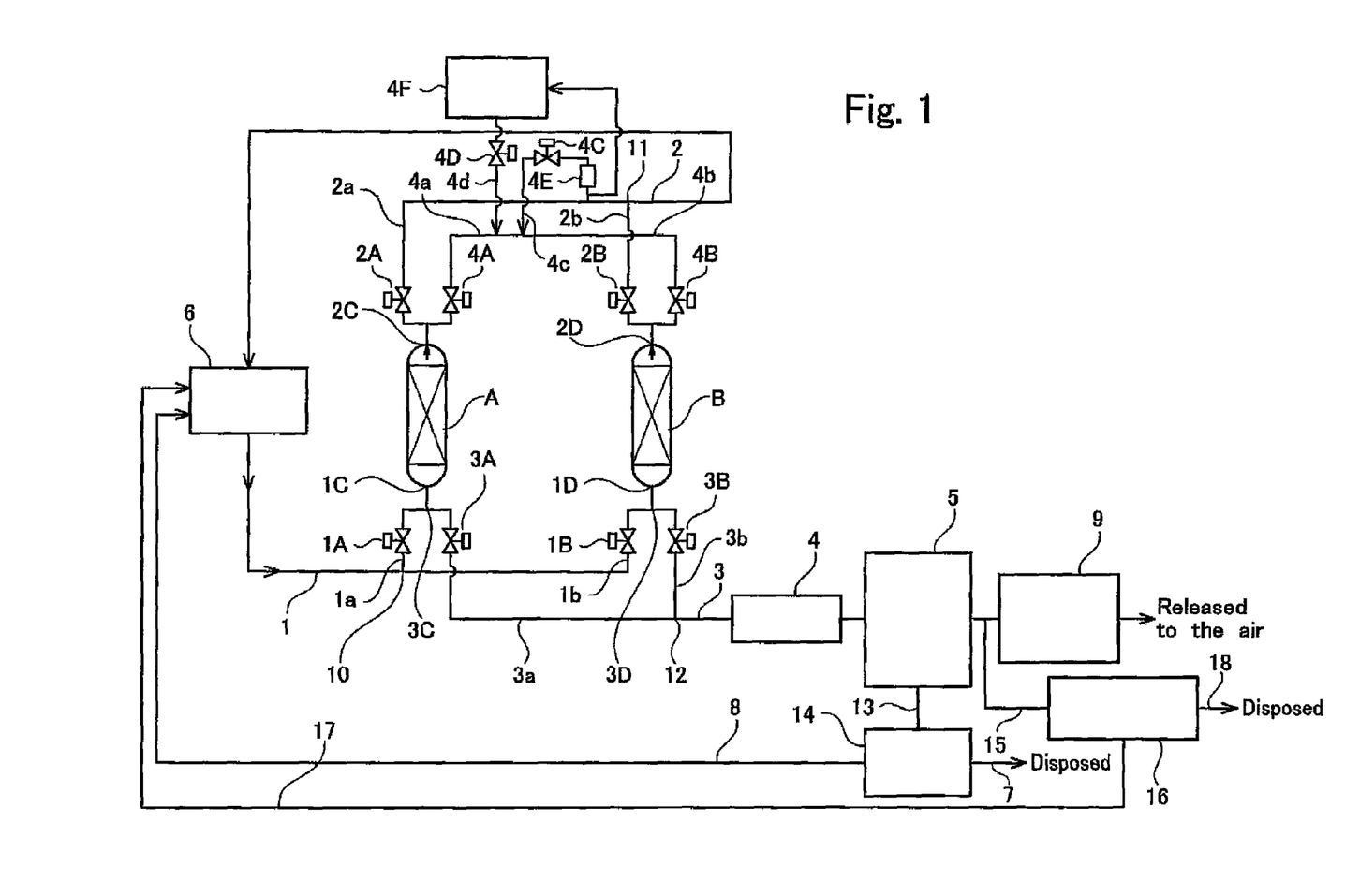

FIG. 1 is an illustration of the whole of the device for reusing an exhaust gas in a polymer production plant according to the present invention.

As shown in FIG. 1, the device for reusing an exhaust gas in a polymer production plant (hereinafter, referred to as "reuse device") according to the present invention is directed to a polymer production plant 6.

In the present invention, the "polymer production plant" refers to a polymer production plant such as a polyolefin production plant including a polymerization, a catalyst therefor, a dryer, an extruder etc.

As shown in FIG. 1, the polymer production plant 6 has an exhaust gas introduction line 1 connected thereto and constituted such that an exhaust gas containing an inert gas such as nitrogen, discharged from the polymer production plant 6, is introduced into the reuse device. The exhaust gas introduction line 1 is branched at a branched part 10 into lines 1a and 1b.

The line 1a is connected via valve 1A and first joint 1C to an adsorption column A having an adsorbent layer for adsorbing and removing impurities such as a polymerization solvent, polymerization monomers etc. contained in an inert gas. Similarly, line 1b is connected via valve 1B and first' joint 1D to an adsorption column B having an adsorbent layer for adsorbing and removing impurities such as a polymerization solvent, polymerization monomers etc. contained in an inert gas.

In the adsorption column A, a second joint 2C is arranged at the opposite side of the first joint 1C. Similarly, a second' joint 2D is arranged at the opposite side of the first' joint 1D in the adsorption column B.

Line 2a is connected to the second joint 2C and connected via valve 2A to a branched part 11. Similarly, line 2b is connected to the second' joint 2D and connected via valve 2B to a branched part 11.

A treated-gas refluxing line 2 for returning (refluxing) a treated gas subjected to adsorption removal treatment in the adsorption columns A and B to the polymer production plant 6 is connected to the branched part 11.

Line 4c leading from line 2 to line 4a or 4b is connected, and a flow meter 4E and valve 4C are arranged in the line 4c. Line 4d leading from line 2 to line 4a or 4b is connected, and a gasholder 4F and valve 4D are arranged in the line 4d.

A third joint 3C is connected at the side of the first joint 1C in the adsorption column A, and the third joint 3C is connected via line 3a to a branched part 12. Similarly, a third' joint 3D is connected at the side of the first' joint 1D in the adsorption column B, and the third' joint 3D is connected via line 3b to the branched part 12. Valve 3A is arranged in the line 3a, and valve 3B is arranged in the line 3b.

The branched part 12 is connected via line 3 to a depressurization device 4 for depressurizing the adsorption column A or adsorption column B, a solvent liquefaction recovery device 5 for recovering a polymerization solvent desorbed and removed from the adsorbent, and an exhaust gas combustion device 9 for combustion and disposal of the desorbed gas from which a polymerization solvent was recovered.

A solvent refining device 14 for refining the polymerization solvent recovered in the solvent liquefaction recovery device 5 is connected via line 13 to the solvent liquefaction recovery device 5. The polymerization solvent refined in the solvent refining device 14 is returned (refluxing) via a polymerization solvent refluxing line 8 to the polymer production plant 6 where the polymerization solvent is reutilized.

On one hand, impurities after refining in the solvent liquefaction device 14 is subjected to suitable treatment and then disposed via a disposal line 7.

A polymerization monomer refining device 16 for refining and reusing the polymerization monomers contained in the desorbed gas from which the polymerization solvent was recovered in the solvent liquefaction recovery device 5 is connected via line 15 to the solvent liquefaction recovery device 5. The polymerization monomers refined in the polymerization monomer refining device 16 is returned (refluxing) via a polymerization monomer refluxing line 17 to the polymer production plant 6 where the polymerization monomers are reutilized.

Hereinafter, the method of reusing an exhaust gas in a polymer production plant is described in detail by using the reuse device constituted above according to the present invention.

An exhaust gas containing an inert gas such as nitrogen from the polymer production plant 6 is introduced via the exhaust gas introduction line 1, branched part 10, and valve 1A in line 1a to the adsorption column A by opening valve 1A under the control of a regulator (not shown).

In this case, valve 1B to the adsorption column B and valve 3A to the depressurization device 4 are regulated in a closed state so that the exhaust gas is prevented from being introduced into the adsorption column B, while the exhaust gas is prevented from being introduced into the depressurization device 4.

During the adsorption operation in the adsorption column A, the valve 2A is maintained in an opened state, while the valve 4A is in a closed state.

In this manner, the inert gas from which impurities were removed by passing through the adsorption column A is introduced from the second joint 2C via valve 2A, line 2a, branched part 11 and treated gas refluxing line 2 into e.g. the drying step again in the polymer production line 6 where the inert gas is reutilized.

Although not shown in the drawing, the inert gas from which impurities were removed bypassing through the adsorption column A requires a certain pressure for reutilization, and thus the gas before sent to the adsorption column A or the refined gas in the outlet of the adsorption column A should be pressurized with a pressurizing device (not shown).

When the adsorption operation is carried out for a certain time, pores are filled with substances adsorbed onto the adsorbent, resulting in failing to treat the exhaust gas to permit the exhaust gas (i.e. breakthrough exhaust gas) to pass through the adsorbent layer.

Before this breakthrough phenomenon occurs in the adsorption column A, the valve 1A is closed and the valves 1B and 2B are opened under the control of the controller, whereby the exhaust gas supplied to the adsorption column A is switched so as to be introduced into the adsorption column B.

In this state, the valve 4B, and valve 3B leading to the depressurization device 4, are regulated to be in a closed state, thus preventing the exhaust gas from being introduced into the depressurization device 4 etc.

The inert gas from which impurities were removed by passing through the adsorption column B, similar to the inert gas through the adsorption column A, is introduced from the second' joint 2D via the valve 2B, line 2b, branched part 11, treated gas refluxing line 2 into e.g. the drying step again in the polymer production plant 6 where the inert gas is reutilized.

By opening the valve 3A, the desorption step in the adsorption column A is initiated by the depressurization device 4.

That is, by opening the valve 3A, the inside of the adsorption column A is depressurized by the depressurization device 4. In this case, the valves 4A and 4C are opened, whereby a part of the treated inert gas returned to the polymer production plant is fed as purge gas from the valve 4A via line 2, flow meter 4E, valve 4C, line 4c and line 4a into the adsorption column A, and introduced via valve 3A via line 3a to the depressurization device 4. In this case, the flow rate of the purge gas flowing from line 2 via line 4c to line 4a is regulated by the flow meter 4E, whereby a predetermined amount of the purge gas is fed to the adsorption column A.

In this case, the depressurization device 4 can be actuated only during the desorption operation, but the depressurization device 4 is actuated preferably continuously.

The polymerization solvent and polymerization monomers adsorbed onto the adsorbent are desorbed by this operation, and together with the purge gas, is transferred downwards through the line 3.

Then, the polymerization solvent contained in the purge gas is liquefied in a cooling part of the solvent liquefaction recovery device 5 and recovered. The polymerization solvent recovered in the solvent liquefaction recovery device 5 is transferred via line 13, refined in the solvent refining device 14 and returned (refluxing) via the polymerization solvent refluxing line 8 to the polymer production plant 6 where the polymerization solvent is reutilized. On the other hand, impurities after refining in the solvent refining device 14 are treated suitably depending on the type of impurities and disposed through the disposal line 7.

The purge gas from which the polymerization solvent was recovered in the solvent liquefaction recovery device 5 contains polymerization monomers, and is thus transferred to an exhaust gas combustion device (flare stack) 9 for combustion and disposal where the polymerization monomers are combusted and released to the air.

Instead of transferring the purge gas from which the polymerization solvent was recovered in the solvent liquefaction recovery device 5 to the exhaust gas combustion device (flare stack) 9, the purge gas from which the polymerization solvent was recovered in the solvent liquefaction recovery device 5 may be transferred via line 15 to a polymerization monomer refining device 16.

That is, the polymerization monomer refining device 16 is for example an ethylene plant or the like where the polymerization monomers contained in the desorbed gas from which the polymerization solvent was recovered in the solvent liquefaction recovery device 5 are refined and returned (refluxing) via a polymerization monomer refluxing line 17 to the polymer production plant 6 where the polymerization monomers are reutilized. On the other hand, impurities after refining in the polymerization monomer refining device 16 are subjected to suitable treatment depending on the type of impurities and disposed through the disposal line 18.

After the adsorption and removal treatment in the adsorption column B is conducted to a certain degree, the valve 1B is closed and the valves 1A and 2A are opened under the control of the regulator before the breakthrough phenomenon occurs in the adsorption column B, similarly to the adsorption column A, whereby the exhaust gas supplied to the adsorption column B is switched so as to be introduced into the adsorption column A.

In this case, the adsorption column A should be pressurized (in a pressure equalization step) to the original pressure in the adsorption column after the desorption operation (just before the adsorption operation). Accordingly, the pressure equalization step is conducted by closing the valve 4C and opening the valve 4D to introduce a part of the treated inert gas refluxed to the polymer production plant, via lines 4d and 4a, into the top of the adsorption column A. In FIG. 1, 4F is a gasholder drum which is arranged when a fluctuation in the pressure of lines 1 and 2 is to be prevented in the pressure equalization step.

By opening the valve 3B, the desorption step in the adsorption column B, similar to that in the adsorption column A, is initiated by the depressurization device 4.

That is, the inside of the adsorption column B is depressurized with the valve 3B in an opened state by the depressurization device 4. In this case, the valves 4B and 4C are opened, whereby a part of the treated inert gas returned to the polymer production plant is fed as the purge gas from the valve 4B, via line 2, flow meter 4E, valve 4C, line 4c and line 4b, to the adsorption column B, and introduced from valve 3B via line 3b to the depressurization device 4. In this case, the flow rate of the purge gas flowing from line 2a via line 4c to line 4b is regulated by the flow meter 4E, whereby a predetermined amount of the purge gas is fed to the adsorption column B.

The polymerization solvent and polymerization monomers adsorbed onto the adsorbent are desorbed by this operation and transferred downwards together with the purge gas through line 3. Liquefaction and recovery of the polymerization solvent in the solvent liquefaction recovery device 5, refining in the solvent refining device 14, refluxing to and use in the polymer production plant, disposal of impurities after refining via the disposal line 7, combustion and disposal of polymerization monomers in the exhaust gas combustion device (flare stack) 9, and refining and reuse of polymerization monomers in the polymerization monomer refining device 16 are conducted in the same manner as in the desorption step in the adsorption column A.

On the basis of detection results from a detector such as a detection sensor (not shown), the cycle described above is automatically conducted under the control of the controller (not shown).

The polymer referred to in the present invention includes, for example, poly-α-olefins such as polyethylene, polypropylene, polybutene-1, polyisobutene, polypentene-1 and polymethylpentene-1; ethylene or α-olefin/α-olefin copolymers such as an ethylene/propylene copolymer having a propylene content of less than 75 wt %, an ethylene/butene-1 copolymer, and a propylene/butene-1 copolymer having a propylene content of less than 75 wt %; ethylene or α-olefin/α-olefin/diene monomer copolymer such as an ethylene/propylene/5-ethylidene-2-norbornene copolymer having a propylene content of less than 75 wt %; ethylene or α-olefin/vinyl monomer copolymers such as an ethylene/vinyl chloride copolymer, ethylene/vinylidene chloride copolymer, ethylene/acrylonitrile copolymer, ethylene/methacrylonitrile copolymer, ethylene/vinyl acetate copolymer, ethylene/acrylamide copolymer, ethylene/methacrylamide copolymer, ethylene/acrylic acid copolymer, ethylene/methacrylic acid copolymer, ethylene/maleic acid copolymer, ethylene/ethyl acrylate copolymer, ethylene/butyl acrylate copolymer, ethylene/methyl methacrylate copolymer, ethylene/maleic anhydride copolymer, ethylene/metal acrylate copolymer, ethylene/metal methacrylate copolymer, ethylene/styrene copolymer, ethylene/methyl styrene copolymer and ethylene/divinyl benzene copolymer; polydiene-based copolymers such as polyisobutene, polybutadiene and polyisoprene; vinyl monomer/diene-based monomer random copolymers such as styrene/butadiene random copolymer; vinyl monomer/diene-based monomer/vinyl monomer block copolymers such as styrene/butadiene/styrene block copolymer; hydrogenated (vinyl monomer/diene-based monomer random copolymer) such as hydrogenated (styrene/butadiene random copolymer); hydrogenated (vinyl monomer/diene-based monomer/vinyl monomer block copolymer) such as hydrogenated (styrene/butadiene/styrene block copolymer); vinyl monomer/diene-based monomer/vinyl monomer graft copolymers such as acrylonitrile/butadiene/styrene copolymer and methyl methacrylate/butadiene/styrene copolymer; vinyl-based polymers such as polyvinyl chloride, polyvinylidene chloride, polyacrylonitrile, polyvinyl acetate, polyethyl acrylate, polybutyl acrylate and polymethyl methacrylate; and vinyl copolymers such as vinyl chloride/acrylonitrile copolymer, vinyl chloride/vinyl acetate copolymer, acrylonitrile/styrene copolymer and methyl methacrylate/styrene copolymer.

The present invention can be applied in a plant for producing polyolefin polymers such as (co) polymers having one or more kinds of α-olefins (co)polymerized therein such as polyethylene and polypropylene, among the polymers described above.

The α-olefins include, for example, α-olefins having 2 to 20 carbon atoms, such as ethylene, propylene, 1-butene, 1-pentene, 1-hexene, 4-methyl-1-pentene, 1-octene, 1-decene, 1-undecene, 1-dodecene, 1-tridecene, 1-tetradecene, 1-pentadecene, 1-hexadecene, 1-heptadecene, 1-octadecene, 1-nonadecene and 1-eocadecene.

Among these, a combination of ethylene and C4 to C10 α-olefin or a combination of propylene and C2 to C10 α-olefin is preferable, and more preferably ethylene and C4 to C8 α-olefin, or propylene and C2 to C8 α-olefin, are copolymerized.

The polyolefin of the present invention can also be used in a plant for producing copolymers by copolymerizing ethylene or propylene with two or more kinds of α-olefins.

The present invention can also be applied to a plant for producing polymers consisting of diene and β-olefins such as 2-pentene, 2-hexene, 2-heptene and 2-octene, or copolymers of different β-olefins.

In this case, a catalyst and an ethylene gas, if necessary comonomers such as propylene and 1-butene and if necessary a polymerization solvent are supplied to the polyethylene production plant, to form polyethylene. Polymerization monomers such as ethylene, propylene and 1-butene and the polymerization solvent are adsorbed in a large amount onto the formed polymer powder discharged from a polymerizer.

A catalyst and a propylene gas, if necessary comonomers such as ethylene and 1-butene and if necessary a polymerization solvent are supplied to the polypropylene production plant, to form polypropylene. Polymerization monomers such as propylene, ethylene and 1-butene and the polymerization solvent are adsorbed in a large amount onto the formed polymer powder discharged from a polymerizer.

The polymerization solvent in the present invention is a solvent which is used in polymerizing a polymer, particularly polyolefin, or used in feeding a catalyst, and examples of the solvent include propane, n-butane, propylene, n-heptane, i-heptane, n-hexane, i-hexane, n-octane, i-octane, n-decane and i-decane.

The inert gas used in the present invention includes nitrogen, argon, helium etc.

In the polyolefin production plant, therefore, impurities such as polymerization monomers, polymerization solvent etc. should be removed from the polymer powder in a drying step following the polymerization step.

That is, these impurities are removed usually preferably by permitting a heated inert gas to flow preferably through a silo filled with the polymer powder or permitting the inert gas to flow as a counter flow to the polymer powder to be transferred.

The inert gas discharged after use in the drying step contains polymerization monomers, polymerization solvent etc.

Accordingly, the discharged inert gas is subjected to adsorption removal treatment, whereby the polymerization monomers, polymerization solvent etc. are removed. Such adsorption removal treatment is conducted usually by passing the inert gas through an adsorbent layer charged with an adsorbent in an adsorption column.

The adsorbent in the present invention refers to powders or particles having at least 0.1 cc/g pores having a diameter of 0.5 to 100 nm, such as silica gel, alumina, montmorilonite, activated carbon or synthetic zeolite.

As the adsorbent, synthetic zeolite and silica gel can be preferably used. The diameter of pores in silica gel is 1 to 20 nm, preferably 3 to 6 nm, and the diameter of pores in synthetic zeolite is 0.3 to 5 nm, preferably 0.5 to 1.5 nm. A combination of these adsorbents is preferably used.

The adsorbent used in this case is preferably an adsorbent not pre-coated with hydrocarbons such as C3 or more hydrocarbons such as pentane, benzene and hexene, or an adsorbent not pre-coated with exhaust gas or pollutant gas.

When the adsorbent not pre-coated with hydrocarbons is used, it is not necessary that gaseous hydrocarbons are previously adsorbed onto the adsorbent until the breakthrough state is reached, and the adsorbent is excellent inoperativeness, has long durability and is suitable for a large production plant such as polymer production plant and for 24-hour continuous operation. Further, the adsorption performance is not reduced, and for desorbing the pre-coated hydrocarbons etc. under reduced pressure, an additional heating desorption device or the operation therefor is unnecessary, to bring about an economical advantage.

In the present invention, it is preferable that the adsorbent layer in the adsorption column A comprises, for example, at least two adsorbent layers different in pore diameter laminated in the order of large to small pore diameters in the direction of flow of an exhaust gas.

In this case, such pore diameters are determined preferably from a material to be adsorbed. For example, silica gel having a large pore diameter (for example, a pore diameter 6 nm) may used for adsorption and removal of a polymerization solvent, C4 to C15 hydrocarbons such as comonomers, and water.

For adsorption and removal of polymerization monomers such as C3 to C4 hydrocarbons, silica gel having a small pore diameter (for example, a pore diameter 3 nm) may be used.

For adsorption and removal of C2 to C3 hydrocarbons, synthetic zeolite is preferably used.

In this case, it is preferable that the adsorbent layer is composed of a single layer of at least one kind of adsorbent selected from silica gel and synthetic zeolite, is formed from plural layers each consisting of a single layer of the same or different kind of adsorbent described above, or is formed from the single or plural layers combined with an adsorbent layer consisting of an adsorbent other than silica gel and synthetic zeolite, or the adsorbent layer is formed from:
(1) a single layer of silica gel or synthetic zeolite,
(2) plural layers having the single layer of silica gel combined with a single layer of zeolite, or
(3) plural layers each consisting of the single layer of silica gel.

By this constitution, impurities in an exhaust gas can be efficiently removed.

In this case, the large diameter of pores in the silica gel is 3 to 10 nm, preferably 4 to 8 nm, while the small diameter of pores in the silica gel is 1 to 5 nm, preferably 2 to 4 nm.

In this case, when silica gel having a small pore diameter is used, the concentration of C4 to C15 hydrocarbons and the water content should be reduced respectively to 500 vol-ppm or less, preferably 200 vol-ppm or less in order to improve the longevity and performance of the adsorbent.

For treatment of an exhaust gas wherein the concentration of C4 to C15 hydrocarbons and the content of water are higher than the above permissible amount, a silica gel layer having a large pore diameter is preferably layered upstream of the silica gel layer having a small pore diameter, in order to reduce the C4 to C15 hydrocarbon concentration and the water content to the permissible concentration.

In the present invention, the silica gel can contain hydrophilic silica gel and/or hydrophobic silica gel.

However, the silica gel is preferably the hydrophobated one because it has a higher ability to adsorb hydrocarbons so that the adsorption column in the adsorption eliminator can be designed to be smaller than with hydrophilic silica gel only. Such hydrophobation treatment includes alkylation of hydroxyl groups on the surface of silica gel.

Such hydrophobated silica gel can sufficiently achieve adsorption and removal of saturation water in an exhaust gas, and thus there is no particular necessity for a larger adsorption column. If necessary, a hydrophilic silica gel layer may be arranged upstream of the hydrophobic silica gel.

When both the hydrophilic silica gel and hydrophobic silica gel are contained, the optimum amount of each adsorbent introduced may be calculated and determined from an economical viewpoint and in consideration of desired adsorptivity.

As the synthetic zeolite in the present invention, hydrophilic and/or hydrophobic synthetic zeolite can be used, but the synthetic zeolite is preferably hydrophilic.

That is, the synthetic zeolite is desirably hydrophilic synthetic zeolite in order to remove polymerization monomers (for example, ethylene and residual propylene) which could not be completely adsorbed and removed by the silica gel layer.

When the synthetic zeolite is used, the concentration of C4 to C15 hydrocarbons and the water content should be reduced respectively to 300 vol-ppm or less, preferably 150 vol-ppm or less, in order to improve the longevity and performance of the adsorbent.

The concentration of C3 hydrocarbons should be reduced to 5000 vol-ppm or less, preferably 2000 vol-ppm or less.

For treatment of an exhaust gas wherein the concentration of C3 to C15 hydrocarbons and the water content are higher than the above permissible amount, the silica gel layer is desirably layered upstream of the synthetic zeolite layer to reduce the C3 to C15 hydrocarbon concentration and water content to the permissible concentration.

When both the hydrophilic synthetic zeolite and hydrophobic synthetic zeolite are contained, the optimum amount of each adsorbent introduced may be calculated and determined from an economical viewpoint and in consideration of desired adsorptivity.

In this case, the hydrophobic silica gel in the present invention includes, for example, silica gel obtained by hydrophobating "CARIACT Q-6" (trade name) etc. produced by Fuji Silysia Chemical Ltd. The hydrophobated silica gel in the present invention includes silica gel obtained by hydrophobating "CARIACTQ-3" (trade name) etc. produced by Fuji Silysia Chemical Ltd.

The synthetic zeolite in the present invention includes, for example, X-type zeolite (trade name: Zeolam F9) and synthetic zeolite High Silica Zeolite Y-type (HSZ-360) with a reduced Al component, available from Tosoh Corporation.

In the adsorption columns A and B, these different adsorbent layers are preferably arranged successively in a layered form. Alternatively, two or more adsorbent layers charged with the above adsorbents respectively can be arranged in series.

As shown in FIG. 1, two adsorption columns A and B may be arranged in a row, or three or more adsorption columns are arranged in a row so that the adsorption removal operation is conducted in one of the adsorption columns, while the adsorption removal operation is conducted in the other adsorption columns, and even if any one of the adsorption columns is in a breakthrough state, the adsorption removal operation can be continuously conducted in the other adsorption columns without stopping the plant, thus preventing the efficiency of operation from dropping.

The purity of exhaust gas flowing from the adsorbent at the upstream side should be a permissible concentration or less in order to minimize the influence of the thickness of each adsorption layer on the adsorbent layer at the downstream side. Although the amount of each adsorbent layer charged is related to the flow rate of an exhaust gas, the adsorption/desorption capacity (adsorbed material/adsorbent ratio by weight) is preferably 0.05 to 10 wt %, particularly preferably 0.1 to 5 wt %, depending on the composition of the gas and the time of contact with the adsorbent, and in the above range, the pressure loss is low and the adsorption time can be prolonged to bring about an industrial advantage.

It is preferable that the speed of the exhaust gas passing in the adsorption column is usually 3 to 20 cm/sec., preferably 5 to 15 cm/sec., because the adsorption treatment can be carried out smoothly, and the pressure loss is low.

By passing the inert gas through the adsorption layer, the purity of the inert gas can be increased to 98% or more, particularly 99% or more. The gas from which impurities were removed in this manner can be reused for example in drying polymer powder by returning the gas to the drying step in the polymer production plant.

Impurities adsorbed onto the adsorbent are desorbed by desorption operation. The operation of desorption from the adsorbent can be carried out preferably by depressurizing the adsorbent while passing a purge gas through the adsorbent layer. The degree of reduced pressure is preferably 13.3 kPa or less, particularly 6.6 kPa or less.

The desorption operation can also be effected for example by conducting the adsorption operation at high pressures and the desorption operation at ordinary pressures.

Accordingly, the desorption operation may be conducted at lower pressures than in the adsorption operation, and the degree of reduced pressure in the desorption operation is determined such that the ratio (Pa/Pd) of pressure in adsorption (Pa) to pressure in desorption (Pd) is 10 to 35, preferably 25 to 35.

The purge gas is preferably a part of the inert gas subjected to adsorption removal treatment, discharged from the polymer production plant, and/or a high-purity inert gas.

In this case, when a part of the gas subjected to adsorption removal treatment is used, 1 to 10 vol %, particularly 2 to 8 vol %, of the gas subjected to the adsorption removal treatment is preferably used as the purge gas.

In impurities based on the adsorbed polymerization solvent, polymerization monomers and water, the polymerization solvent is recovered by liquefaction under cooling. The polymerization solvent recovered by cooling liquefaction is subjected to distillation and reused preferably as polymerization solvent.

Hereinabove, the preferable embodiments of the present invention have been described in detail, but the present invention is not limited thereto, and can be changed within the scope of the present invention.

EXAMPLES

Example 1

A nitrogen gas containing 3.5 vol-% propylene, 0.2 vol % ethylene, 3.5 vol % n-hexane as a polymerization solvent, and 0.8 vol % water, discharged from a polypropylene polymer production plant was fed at a rate of 50 L/min. to an adsorption column having an internal diameter of $\phi$200 mm and a height of 700 mm as shown in FIG. 1.

The absorption column had been charged with an adsorbent consisting of 3 layers, that is, a 35-cm hydrophobic silica gel layer (trade name: Q-6, spherical #5 to #10 meshes, manufactured by Fuji Silysia), a 15-cm hydrophilic silica gel layer (trade name: "A", spherical #5 to #10 meshes, manufactured by Fuji Silysia), and a 20-cm synthetic zeolite layer (trade name: F9, manufactured by Tosoh Corporation).

The absorption and desorption were switched at 5-minute cycles. The composition of the treated nitrogen gas in line 2 in the outlet of the adsorption column had contained 16 vol-ppm propylene, 5 vol-ppm ethylene, 1 vol-ppm n-hexane, and 10 vol-ppm or less water.

4 vol-% of the treated gas was supplied as a purge gas in the desorption step. Simultaneously, the absorption column was depressurized by a vacuum pump. The degree of reduced pressure in the absorption column was 3.3 kPa. The composition of the desorbed gas was composed of 46 vol-% propylene, 2 vol-% ethylene, 46 vol-% n-hexane, 0.2 vol-% water, and 7 vol-% nitrogen.

The purge gas was cooled to 15° C. in a solvent liquefaction recovery device 5 to liquefy n-hexane. The composition of the gas in line 8 was composed of 13 vol-% nitrogen gas, 76 vol-% propylene, 9 vol-% n-hexane and 0.2 vol-% water.

Example 2

An adsorption column of 20 cm in diameter was charged, as shown in Table 1 in the direction of flow of an exhaust gas, with an adsorbent consisting of the following 3 layers:

a hydrophobic silica gel (Q-6 (trade name), spherical #10 to #20 meshes, manufactured by Fuji Silysia) layer, a hydrophobic silica gel (Q-3 (trade name), spherical #5 to #10 meshes, manufactured by Fuji Silysia) layer, and synthetic zeolite (F-9 (trade name), Tosoh Corporation)

The absorption and desorption were switched at 10-minute cycles. An exhaust gas was supplied at ordinary temperatures at a pressure of 5 kPaG, and the concentration of hydrocarbons and water content at the outlet of each adsorbent layer were analyzed. As the inert purge gas for desorption, nitrogen (purity, 99.99%; water content, 10 ppm or less) was used in desorption at 3.3 kPaA.

While the continuous operation is continued, the durability of the adsorbent was calculated in consideration of the deterioration in performance of the adsorbent by examining the concentration of nitrogen at the outlet of the final adsorbent (F9) wherein the permissible purity of nitrogen for the polyolefin production plant was regarded as 99.5% or more.

Without pre-coating the hydrophobic silica gel (Q-6, Q-3) and synthetic zeolite (F-9), the nitrogen purity could be within the permissible level continuously for 365 days or more by reducing the concentration of hydrocarbons at the outlets of Q-6 and Q-3 to a low level.

TABLE 1

Constitution and performance of the adsorbent in Example 2

|  | Unit | Example 2 |
|---|---|---|
| Temperature | °C. | 25 |
| Adsorption pressure | kPaG | 106 |
| Desorption pressure | kPaA | 3.3 |
| Amount of purge gas | L/min | 3 |
| Adsorption/desorption time | min | 10 |
| Amount of exhaust gas | L/min | 50 |
| Composition |  |  |
| Ethylene (C2) | % | 0.3 |
| Propylene (C3) | % | 3.7 |
| Hexane (C6) | % | 3.2 |
| Water content | % | 0.8 |
| Nitrogen | % | 92.0 |
| Adsorbent |  |  |
| Presence or absence of pre-coating |  | None |
| Hydrophobic silica gel (Q6) | Charged amount (kg) | 5.1 |
| C2 concentration at the outlet | ppm | 3000 |
| C3 concentration at the outlet | ppm | 37000 |
| C6 concentration at the outlet | ppm | <50 |
| Water content at the outlet | ppm | <10 |
| Hydrophilic silica gel (Q3) | Charged amount (kg) | 11.0 |
| C2 concentration at the outlet | ppm | 3000 |
| C3 concentration at the outlet | ppm | 1500 |
| C6 concentration at the outlet | ppm | <50 |
| Water content at the outlet | ppm | <10 |
| Synthetic zeolite (F9) | Charged amount (kg) | 2.0 |
| C2 concentration at the outlet | ppm | 275 |
| C3 concentration at the outlet | ppm | 100 |
| C6 concentration at the outlet | ppm | <50 |
| Water content at the outlet | ppm | <10 |
| Nitrogen content at the outlet | % | 99.96 |
| Estimated durability | days | 365 days or more |

Example 3

An adsorption column of 1.6 m in diameter was charged in the direction of flow of an exhaust gas with 3 layers, that is, a 1200-kg hydrophobic silica gel (Q-6 (trade name), spherical #10 to #20 meshes, manufactured by Fuji Silysia) layer, a 2500-kg hydrophobic silica gel (Q-3 (trade name), spherical #5 to #10 meshes, manufactured by Fuji Silysia) layer, and a 600-kg synthetic zeolite (F-9 (trade name), Tosoh Corporation).

The adsorption and desorption were switched respectively at 11-minute cycles. An exhaust gas having an average composition of 0.2% ethylene, 3.0% propylene, 2.8% hexane, 1.0% water and 93.0% nitrogen was supplied at 25 to 30° C., at a pressure of 20 kPaG, at a flow rate of 600 to 700 Nm$^3$/h. As the inert purge gas for desorption, 35 Nm$^3$/h nitrogen from which pollutants had been removed was used in desorption at 3.3 kPaA.

For pressurization within 30 seconds from a depressurized state in the desorption step to an operational pressurized state in the adsorption step, an inert gas holder drum was arranged. A solvent liquefaction recovery device (cooler) was also arranged for recovering hexane.

Even after 365 days, the purity of the inert gas at the outlet of F-9 was 99.8% or more in terms of nitrogen purity and the water content was 10 ppm or less.

By arranging the inert gas holder drum, the fluctuation of the flow rate through the adsorption column could be limited to a small range within 0 to 20 Nm$^3$/h. When the desorbed gas was cooled to 5° C., the recovery of hexane was 80% or more.

Comparative Example 1

The same operation as in the same in Example 3 was carried out except that the inert gas holder drum was not used. In this case, the flow rate through the adsorption column was fluctuated in a broad range of 0 to 700 Nm$^3$/h, and the exhaust gas feeding device and the inert gas pressurization device was emergently stopped.

From the results described above, the effect of the present invention is evident.

INDUSTRIAL APPLICABILITY

According to the present invention, an inert gas discharged from a polymer production plant such as a plant for producing polyolefin polymers such as polyethylene and polypropylene is passed through an adsorbent layer, whereby a polymerization solvent and polymerization monomers contained in the inert gas can be adsorbed and removed. Then, the inert gas reaching a predetermined purity by adsorbing and removing the polymer solvent and polymerization monomers can be reused in the polymer production plant.

Accordingly, the present invention is opposed to the prior art wherein a polymerization solvent and polymerization monomers contained in an inert gas are burned and then the burned gas and the inert gas are released to the air. Therefore, global warming attributable to $CO_2$ gas can be prevented.

Further, the inert gas can be reused in the polymer production plant and effectively utilized as a resource, which is extremely useful in respect of energy saving.

When the adsorbent not pre-coated with hydrocarbons is used in the present invention, it is not necessary that gaseous hydrocarbons are previously adsorbed onto the adsorbent until the breakthrough state is reached, and the adsorbent is excellent in operativeness, has long durability and is suitable for a large production plant such as polymer production plant and for 24-hour continuous operation. Further, the adsorption performance is not reduced, and for desorbing the pre-coated hydrocarbons etc. under reduced pressure, an additional heating desorption device or the operation therefor is unnecessary, to bring about an economical advantage.

According to the present invention, the polymerization solvent and polymerization monomers adsorbed onto the adsorbent in the adsorbent layer can be desorbed and removed from the adsorbent. When the adsorption operation is carried out for a certain time, pores are filled with substances adsorbed onto the adsorbent, resulting in failing to treat the exhaust gas to permit the exhaust gas (i.e. breakthrough exhaust gas) to pass through the adsorbent layer, but the present invention can cancel this breakthrough, to restore an action on adsorption and removal.

According to the present invention, a part of the inert gas reaching a predetermined purity by removing the polymerization solvent and polymerization monomers in the step of adsorption and removal can be used as the purge gas, thus making use of a new inert gas source unnecessary, thus improving efficiency, reducing costs and contributing to resource saving.

According to the present invention, the polymerization solvent desorbed and removed from the adsorbent in the adsorbent layer can be recovered and reused in the polymer production plant, thus improving efficiency, reducing costs and contributing to resource saving.

According to the present invention, the polymerization solvent is recovered from the desorbed gas, and polymerization monomers in the desorbed gas are then combusted and released to the air, and thus $CO_2$ gas is hardly generated and global warming is not caused.

According to the present invention, the adsorption removal operation is conducted in one of the adsorption eliminators, while the adsorption removal operation is conducted in the other adsorption eliminator(s); therefore, even if any one of the adsorption eliminators is in a breakthrough state, the adsorption removal operation can be continuously conducted in the other adsorption eliminator(s) without stopping the plant, thus preventing the efficiency of operation from dropping. The present invention exhibits many significant and special working effects described above.

What is claimed is:

1. A method of reusing an exhaust gas in a polymer production plant in order to reuse an inert gas within said exhaust gas discharged from a polymer production plant, which comprises a step of adsorbing and removing a polymerization solvent and polymerization monomers contained in said inert gas by passing, through an adsorbent layer, wherein said absorbent layer is formed from:
   a hydrophobic silica gel, hydrophilic silica gel and synthetic zeolite laminated in the order in the direction of flow of the exhaust gas,
   said exhaust gas containing said inert gas discharged from the polymer production plant, wherein said inert gas reaching a predetermined purity by removing the polymerization solvent and polymerization monomers in the step of adsorption and removal is reused in the polymer production plant.

2. The method of reusing an exhaust gas in a polymer production plant according to claim 1, wherein the polymer in the polymer production plant is an olefinic polymer.

3. The method of reusing an exhaust gas in a polymer production plant according to claim 1 or 2, wherein in the step of adsorption and removal, water is also removed.

4. The method of reusing an exhaust gas in a polymer production plant according to claim 1 or 2, which comprises a step of desorbing and removing, from the adsorbent, the polymerization solvent and polymerization monomers adsorbed onto the adsorbent in the adsorbent layer by depressurization.

5. The method of reusing an exhaust gas in a polymer production plant according to claim 1 or 2, which comprises a step of desorbing and removing, from the adsorbent, the polymerization solvent and polymerization monomers adsorbed onto the adsorbent in the adsorbent layer by depressurization while introducing a purge gas.

6. The method of reusing an exhaust gas in a polymer production plant according to claim 5, wherein the purge gas is an inert gas reaching a predetermined purity by removing the polymerization solvent and polymerization monomers in the step of adsorption and removal.

7. The method of reusing an exhaust gas in a polymer production plant according to claim 1 or 2, wherein the inert gas reaching a predetermined purity by removing, with the adsorbent layer, the polymerization solvent and polymerization monomers contained in the inert gas is refluxed to the polymer production plant in order to use the inert gas in the polymer production plant.

8. The method of reusing an exhaust gas in a polymer production plant according to claim 1 or 2, wherein the adsorbent layer is pressurized with an inert gas holder drum from a depressurized state in the desorption step to an operational pressurized state in the adsorption step.

9. The method of reusing an exhaust gas in a polymer production plant according to claim 1 or 2, wherein at least one kind of adsorbent used in the adsorbent layer is formed from the adsorbent not pre-coated with hydrocarbons.

* * * * *